July 27, 1965 W. BATTENFELD ETAL 3,196,485
APPARATUS FOR MANUFACTURING OF PRESSED FORM-PIECES
OF ARTIFICIAL MATERIAL
Filed April 10, 1962 3 Sheets-Sheet 1

INVENTORS
WERNER BATTENFELD
ERHARD LANGECKER

BY
ATTORNEY.

July 27, 1965 W. BATTENFELD ETAL 3,196,485
APPARATUS FOR MANUFACTURING OF PRESSED FORM-PIECES
OF ARTIFICIAL MATERIAL
Filed April 10, 1962 3 Sheets-Sheet 2

INVENTORS
WERNER BATTENFELD
ERHARD LANGECKER
BY

ATTORNEY.

July 27, 1965 W. BATTENFELD ETAL 3,196,485
APPARATUS FOR MANUFACTURING OF PRESSED FORM-PIECES
OF ARTIFICIAL MATERIAL
Filed April 10, 1962 3 Sheets-Sheet 3
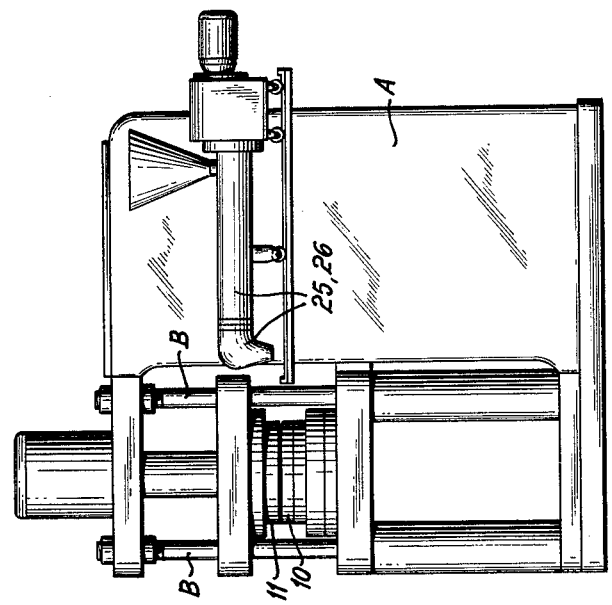
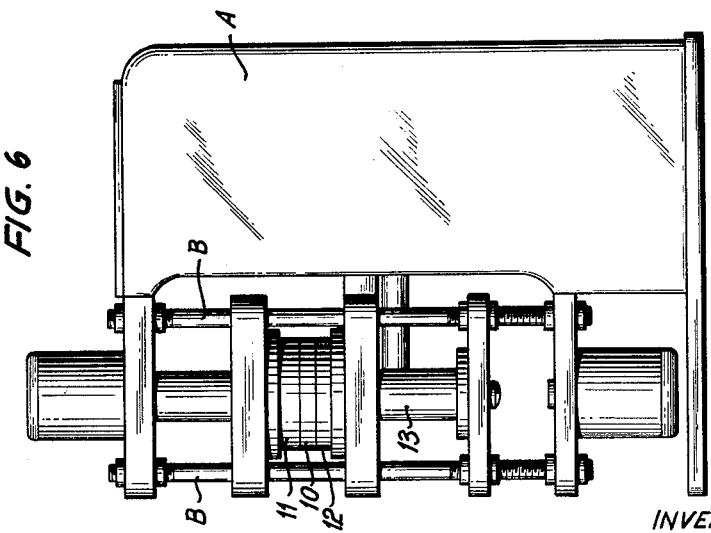
INVENTORS
WERNER BATTENFELD
ERHARD LANGECKER
BY
ATTORNEY.

united States Patent Office
3,196,485
Patented July 27, 1965

3,196,485
APPARATUS FOR MANUFACTURING OF PRESSED
FORM-PIECES OF ARTIFICIAL MATERIAL
Werner Battenfeld, Lindenstrasse, and Erhard Langecker, Oststrasse 32, both of Meinerzhagen, Westphalia, Germany
Filed Apr. 10, 1962, Ser. No. 186,490
4 Claims. (Cl. 18—5.3)

The present invention relates to an apparatus for manufacturing of pressed form-pieces of artificial material.

It is known to work thermoplastic artificial material in a pressure spraying process by pressing plasticized material from a plasticizing cylinder into a completely closed mold. The thermoplastic mass flows then along the walls of a hollow mold for filling the latter. This manufacturing process is, however, not suitable for the manufacture of particularly thin-walled parts with an extremely fine outer surface. For the manufacture of such parts, for instance, for the manufacture of playing records of thermoplastic artificial material having a grooved profile on its surface, a plastic paste pellet is fed into a partly opened mold whereupon the latter is closed. By this arrangement the superfluous material is driven out of the mold and is squeezed off.

During the pressing operation of artificial material, which lends itself to hardening, this horizontal removal of superfluous material is avoided by a so-called filling chamber. Since the sealing of this filling chamber takes place through the two mold halves of the hollow mold and through the press stamp, a safe sealing is not assured, since the best possible tolerance, caused by temperature differences of the mold and by inaccuracies in the guidance of the press requires a greater play, than would be necessary in order to bring about a complete sealing.

It is, therefore, one object of the present invention to provide an apparatus for the manufacture of pressed form-pieces of artificial material, particularly of such form-pieces, which are of plate-like shape, preferably having a surface profile, which comprises a mold consisting of an upper mold part, and an intermediate mold part, as well as a lower mold part and also means for feeding the plastic mass into the mold, and in which the intermediate mold part guides sealingly on or about the lower mold part during a lifting and lowering movement, respectively.

It is another object of the present invention to provide an apparatus for the manufacture of pressed form-pieces of artificial material, wherein the intermediate mold part is formed substantially as annular sealing frame or sealing rim, the axially extending inner wall face of which cooperates with the axially extending outer wall face of the lower mold part.

It is yet another object of the present invention to provide an apparatus for the manufacture of pressed form-pieces of artificial material, wherein the intermediate mold part has a conical guide extension in order to provide a centering guide for the upper mold part during the movement of the mold parts towards each other, the guide extension projecting axially from the intermediate mold part and cooperating with a complementary guide recess within the upper mold part. A sealing cooperation is thus formed between the intermediate mold part and the upper mold part, by engagement of a radially disposed supporting face of the intermediate mold part, by means of an intermediate matrix resting thereon, with a complementary supporting face of the upper mold part.

It has been found that the present apparatus is particularly suitable for the manufacture of surface-profile plates, for instance, for the manufacture of playing records. For this purpose, the intermediate mold part is equipped with a recess for receiving a matrix which carries the desired surface profile and in which the paste pellet is subjected to pressure to create the final product during the movement of the form parts towards each other.

The most important advantage of the application of the present apparatus, in comparison with a spraying device for spraying directly into the closed mold, is found in the fact that the parts manufactured by the present apparatus have a non-objectionable surface formation and, first of all, lead to tension-free and tension-balanced parts, since the required pressure and density compression operates directly over the entire surface, while during the spraying process the follow-up pressure must occur from the spraying point, so that the parts, manufactured in accordance with the conventional method, have appreciable tensions, which bring about appreciable drawbacks.

It is also of importance that the sealing between the intermediate mold part and the upper mold part takes place independently from the closing movement of the mold by springs or by pressure pillows. In a practical application of this apparatus, it is advantageous to support the intermediate mold part, namely the sealing frame or sealing rim in axial direction by means of counter-pressure creating means or yielding means, for instance, by springs or by pressure pillows operating pneumatically or hydraulically, so that the sealing frame or sealing rim, which is lowered during the movement of the mold parts, can be safely lifted again into its original position.

Finally, it is also of importance in this connection, that the material, disposed prior to the pressing step as a paste-pellet in the hollow space of the mold, is fed, in accordance with the present invention, either from below through the lower mold part, or from the tool side in lateral direction, whereby the corresponding most favorable feeding means are chosen dependent upon the particular circumstances.

With these and other objects in view, which will become apparent in the following detailed description, the present invention will be clearly understood in connection with the accompanying drawings, in which:

FIG. 6 is a front elevation of a molding press indicating material feeding from below; and FIG. 7 is a front elevation of a molding press indicating a lateral material feeding.

Figure 1:
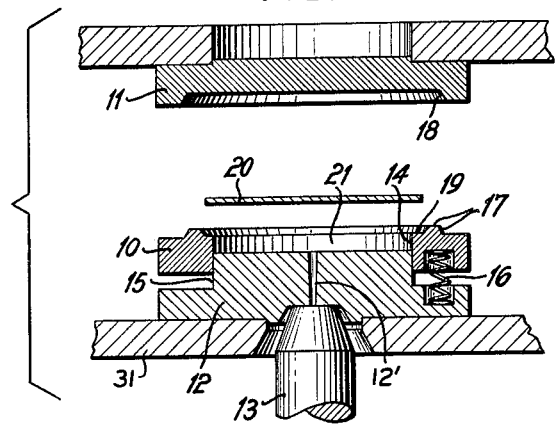
FIGURE 1 is a section of a hollow mold in its open position.
Figure 2:
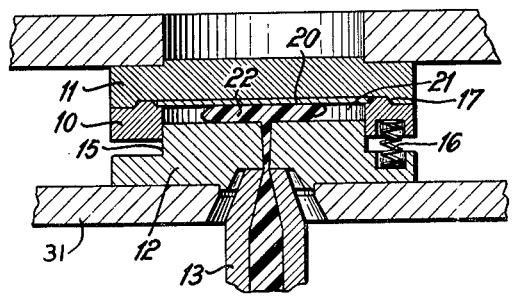
FIG. 2 is a section of the hollow mold in its closed position, yet prior to the material pressing.
Figure 3:
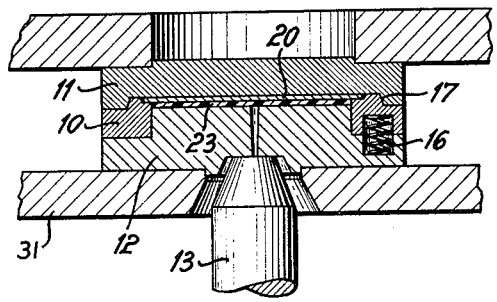
FIG. 3 is a section of the hollow mold in its completely closed position, in the state in which the starting material is already formed to a plate.
Figure 4:
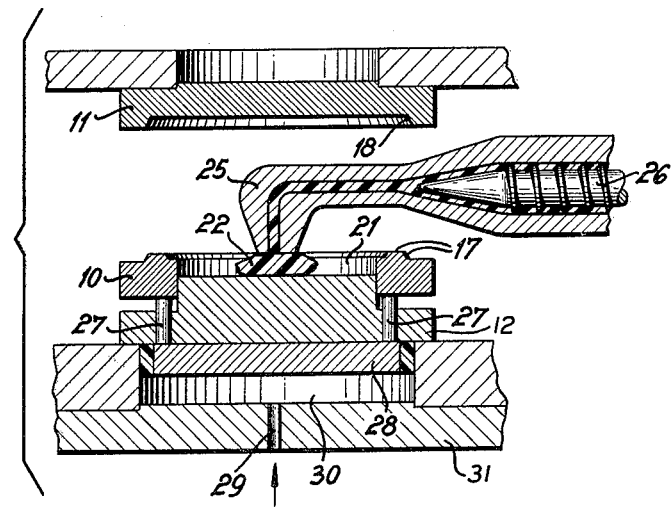
FIG. 4 is an exploded view, in section, of a hollow mold in its open position indicating the lateral feeding of the starting material and support of the sealing frame by means of a pressure pillow.
Figure 5:
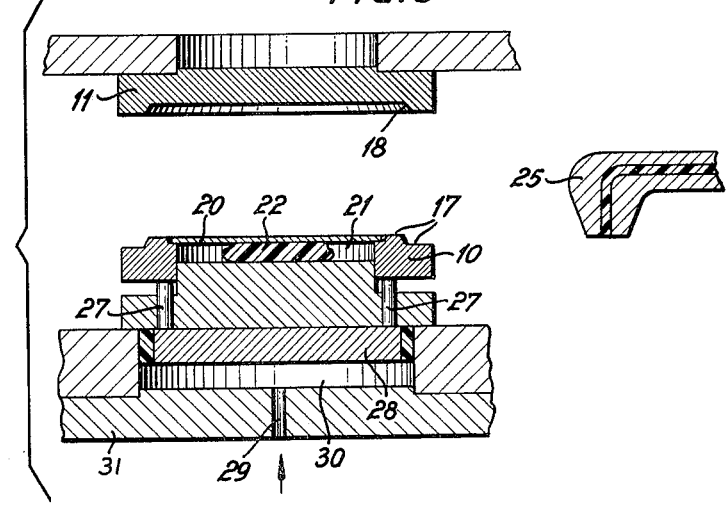
FIG. 5 is an exploded section of the hollow form shown in FIG. 4, shown in the advanced state of operation.

Referring now to the drawings, and in particular to FIGS. 1 to 3, an apparatus is disclosed for the manufacture of pressed form-pieces, particularly of plate-like shape, which apparatus comprises an intermediate mold part 10, an upper mold part 11, a lower mold part 12, as well as material feeding means 13, as shown in FIGS. 1 to 3, or material feeding means 25 and 26, as shown in FIGS. 4 and 5.

In accordance with the present invention, the intermediate mold part 10 is formed as a sealing frame or sealing rim, which is guided by its inner cylindrical wall face 14 on the outer cylindrical wall face 15 of the lower mold part 12 and axially movable for a lifting or lowering movement. The sealing frame or sealing rim 10 is axially supported, in the embodiment disclosed in FIGS. 1 to 3 of the drawings, by springs 16 which are received in axially disposed wall recesses of the sealing frame or sealing rim 10, as well as complementary recesses of the lower mold part 12, which are arranged opposite the first mentioned recesses.

A guide, for instance, a conically formed guide 17, is provided on the upper portion of the intermediate mold part 10, formed as a sealing frame or sealing rim, which guide 17 guides the upper mold part 11 into a centering position by means of a complementary guide 18 of the upper mold part 11. The inside of the sealing frame 10 is equipped with an engaging face 19, which is adapted to receive a matrix 20 and is adapted to seal the hollow space 21, the thickness of the matrix 20 being slightly greater than the axial distance of the engaging face 19 from the uppermost face of the intermediate mold part 10.

A paste pellet 22 of plastic material is inserted into the space 21 defined by the matrix 20 and the upper face of the lower mold part 12, which paste pellet 22 is compressed upon closing the mold parts 10 and 11 towards each other on the one hand on the surface of the lower mold part 12 and on the other hand on the matrix 20, and thus, forms a plate 23.

The feeding of the paste pellet 22 into the space 21 can be performed, in accordance with the embodiments of FIGS. 1 to 3, from below by means of a feeding tube 13 through an axial bore 12' provided in the lower mold part 12.

On the other hand, in the embodiment disclosed in FIGS. 4 and 5, the material is fed to the mold halves laterally from above in such manner, that the nozzle 25, for instance, of a worm cylinder 26, can be moved from the side of the injection of the paste pellet 22, which feeding means may be of advantage under certain circumstances. FIGS. 4 and 5 also show a solution for the axial support of the sealing frame or sealing rim 10 as a solution equivalent to that shown in FIGS. 1 to 3, whereby force transmitting bolts 27 or the like extend through the lower mold part 12 and which force transmitting bolts 27 are supported by a piston-like or sleeve-like pressure plate 28, which is subjected to a hydraulic or pneumatic counter-pressure and thus forms a pressure pillow. The pressure means may be fed into the chamber 30 disposed below the pressure plate 28 by means of a bore 29 provided in the base 31.

The shown and described embodiments of the present invention are mere examples of a realization of the present invention, and the latter is not limited thereto, rather many other embodiments as well as applications are possible within the framework of the present invention. In this connection it is expressly stated, that it is also possible to produce with the above described apparatus any other form-piece which has a shape different than a plate. It is merely essential that due to the design of the matrix 10, which is formed as a sealing frame or sealing rim and is movable under pressure, the hollow space 21 is reduced during the closing movement of the mold parts and furthermore, that a reliable sealing is also created between the lower mold part 12 and the intermediate mold part 10, as is also present between the intermediate mold part 10 and the upper mold part 11.

In order to subject the mold parts to precise predetermined temperatures, it is possible to arrange in the matrix 10, as well as in the punch 11 and also in the core stamp 12, a plurality of channels (not shown) in order to feed a heating or a cooling medium thereto, thereby bringing about the desired temperature of the mold parts.

Referring now to FIGS. 6 and 7 of the drawings, it will be seen, that conventional mold presses can be used for the specific molding apparatus. FIG. 6 discloses a machine in which the feeding of material is brought about, as shown in FIGS. 1 to 3 of the drawings, through the lower mold part 12, and in particular through the bore 12' thereof, while FIG. 7 shows a machine, in which the material to be worked is fed by means of a movable feeding device 25 and 26, which is laterally movable by arranging wheels on the latter, which permit a movement towards or from the mold by running the wheels 32 on laterally disposed tracks 33. The machine frames A are disposed on one side of the presses, while the mold parts 10 and 11 are guided by columns B provided at one side of the machine.

While we have disclosed several embodiments of the present invention, it is to be understood that these embodiments are given by example only and not in a limiting sense, the scope of the present invention being determined by the objects and the claims.

We claim:
1. An apparatus for the manufacture of pressed plate-like form-pieces of synthetic material, comprising
   an intermediate mold part having a central recess,
   a lower mold part disposed adjacent said intermediate mold part, and having a central projection received guidingly in said central recess of said intermediate mold part,
   a matrix having a surface profile and being removably and sealingly received in said intermediate mold part to close one end of said central recess of said intermediate mold part,
   an upper mold part disposed coaxially opposite said intermediate mold part and engaging the latter, as well as said matrix in operative position,
   said matrix, said intermediate mold part and said lower mold part defining jointly a cavity therebetween, and
   yielding means disposed between said intermediate mold part and said lower mold part to narrow down said cavity upon exerting axial pressure between said upper mold part and said intermediate mold part.
2. The apparatus, as set forth in claim 1, wherein
   said upper mold part and said intermediate mold part have complementary centering guide means in order to locate said upper mold part relative to said intermediate mold part in their engaging operative position.
3. The apparatus, as set forth in claim 2, wherein
   said centering guide means comprises complementary conical faces in said upper mold part and in said intermediate mold part, respectively.
4. The apparatus, as set forth in claim 1, wherein
   said intermediate mold part has a conically formed guide at its face engaging said upper mold part in order to locate said matrix in said intermediate mold part.

References Cited by the Examiner

UNITED STATES PATENTS

| | | | |
|---|---|---|---|
| 1,327,722 | 1/20 | Mayer | 18—5.3 |
| 1,447,183 | 3/23 | Roberts | 18—5.3 |
| 1,541,967 | 6/25 | Klinkenstein et al. | 18—34 |
| 2,708,288 | 5/55 | Fuller et al. | 18—34 |
| 2,715,752 | 8/55 | Hunter | 18—5.3 |
| 2,850,766 | 9/58 | Press et al. | 18—30 |
| 2,883,704 | 4/59 | Jurgeleit | 18—42 |
| 2,900,664 | 8/59 | Hampel et al. | 18—34 |
| 2,963,738 | 12/60 | Brandes et al. | 18—16 |
| 3,013,304 | 12/61 | Riche et al. | 18—30 |

J. SPENCER OVERHOLSER, *Primary Examiner.*
MICHAEL V. BRINDISI, *Examiner.*